UNITED STATES PATENT OFFICE.

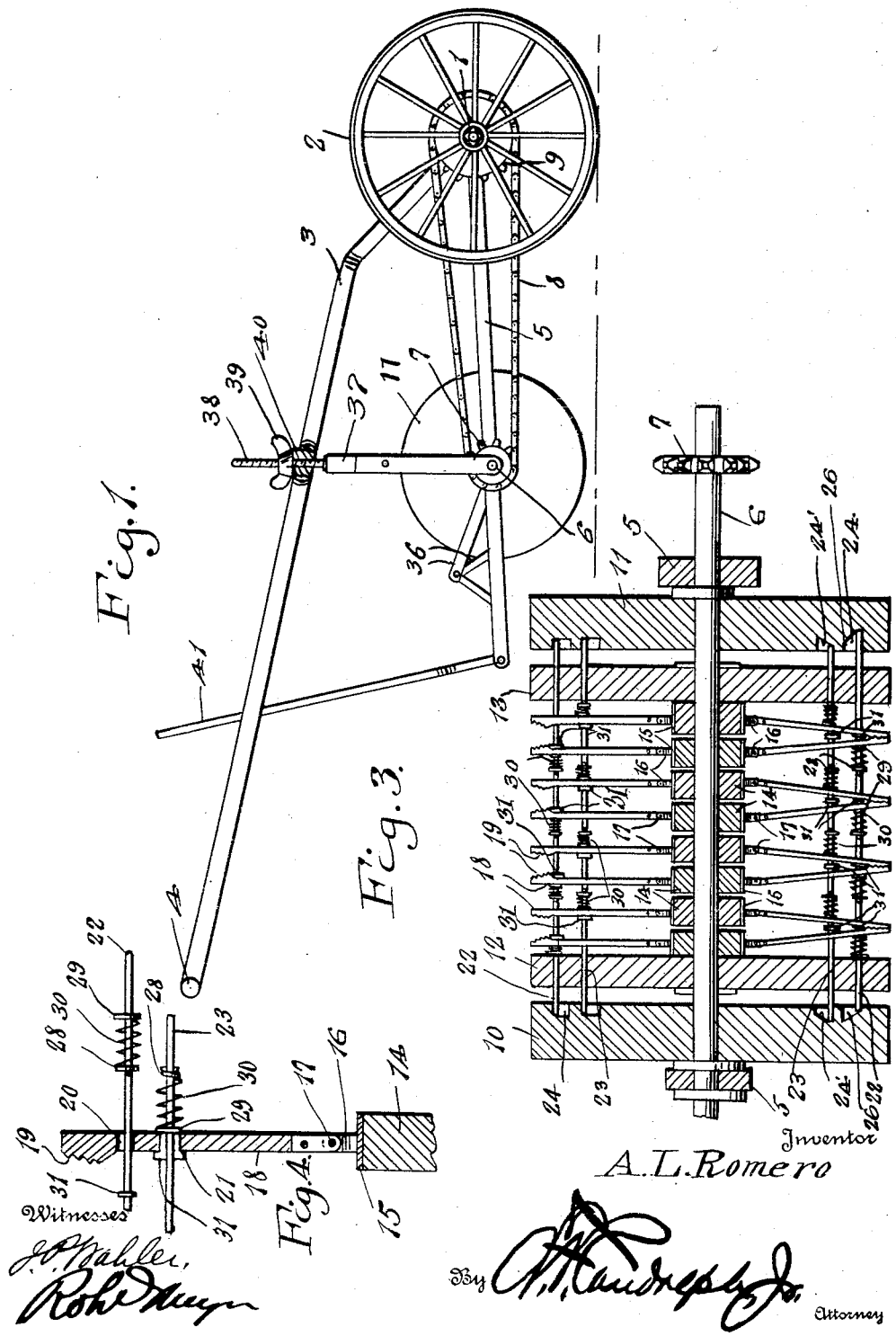

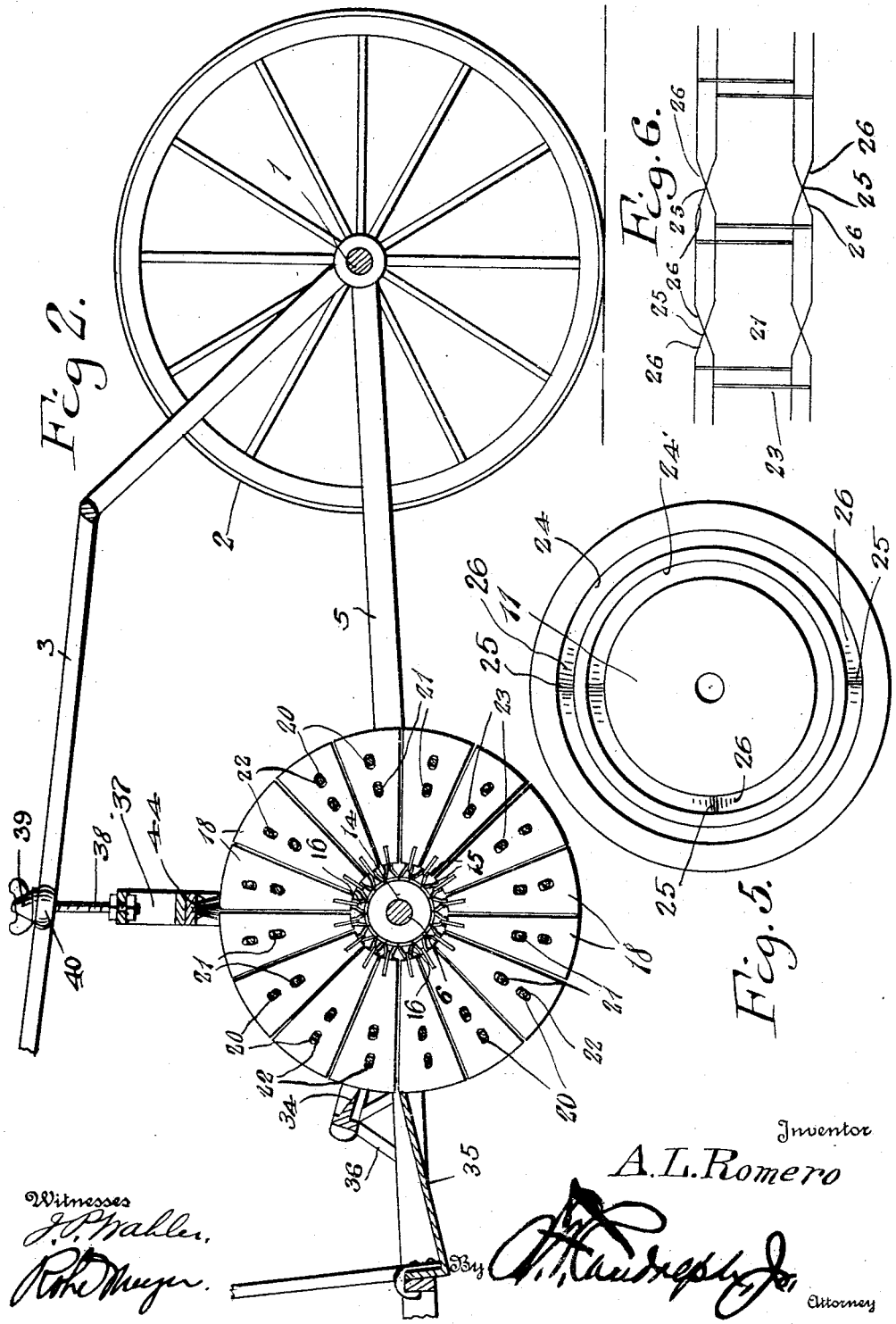

ALFREDO L. ROMERO, OF JERSEY, CALIFORNIA.

WEED-PULLER.

1,274,201.   Specification of Letters Patent.   Patented July 30, 1918.

Application filed July 13, 1917. Serial No. 180,425.

*To all whom it may concern:*

Be it known that I, ALFREDO L. ROMERO, a citizen of the United States, residing at Jersey, in the county of Contra Costa and State of California, have invented certain new and useful Improvements in Weed-Pullers; and I do hereby declare the following to be a full, clear, and exact description of the invention, such as will enable others skilled in the art to which it appertains to make and use the same.

This invention relates to a device for pulling weeds and one which is particularly designed for use in pulling weeds from truck farms or beds, flower beds, gardens or the like, and the primary object of the invention is to provide a weed pulling machine which employs a plurality of weed gripping and pulling members that are moved by the travel of the puller into weed gripping position and into open weed delivering positions so that the weeds in a bed and vegetables, flowers or the like may be pulled by the travel of the puller over the bed. It is a well known fact that weeds grow faster than the truck or vegetables and another object of the invention is to provide means for adjusting the position of the pulling elements or members so that they will grip the tops of the weeds above the vegetables and pull the weeds and leaving the vegetables untouched.

Another object of this invention is to provide a weed puller as specified which includes a plurality of sets of hingedly mounted weed gripping members which are carried by a suitable hub structure, and to provide means for rotating the hub structure and also cams which engage a plurality of operating rods for moving the weed gripping members of each pair into weed gripping positions and out of weed gripping positions into weed depositing positions, for depositing the weeds after they have been pulled.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:

Figure 1 is a side elevation of the improved weed puller,

Fig. 2 is an enlarged longitudinal section through a part of the weed puller,

Fig. 3 is a transverse vertical section through the weed puller,

Fig. 4 is an enlarged detail section through one of the weed gripping plates,

Fig. 5 is a face view of one of the cams employed for operating the weed pulling members, and Fig. 6 is a diagrammatic view of the cam structures employed for operating the weed pulling plates.

Referring more particularly to the drawings, 1 designates the main supporting axle of the weed puller which has supporting wheels 2 mounted thereon. Attached to the axle and extending rearwardly therefrom is a supporting bar 3 which has a handle 4 carried by its rear end. The axle 2 also has a supporting frame structure 5 attached thereto and extending rearwardly therefrom which supports a shaft 6, rearwardly of the axle 1. The shaft 6 has a sprocket 7 mounted thereon about which a sprocket chain 8 travels. The sprocket chain 8 also travels about a sprocket 9 carried by the axle 1, for rotating the shaft 6 by the rotation of the axle 1.

The shaft 6 has a pair of cams 10 and 11 mounted thereon and a pair of rollers 12 and 13 also mounted thereon inwardly of the cams 10 and 11, as clearly shown in Fig. 3 of the drawings. Positioned between the facing sides of the rollers 12 and 13 is a plurality of collars 14. The collars 14 have rings 15 mounted about their periphery upon which rings are formed a plurality of outwardly extending plates 16 at spaced intervals about the circumference of the rings 15. The plates 16 are pivotally connected as shown at 17 to the weed pulling plates 18. The weed pulling plates 18 are formed in segments of a circle and each set comprises a plurality of plates arranged circumferentially about the collars 14 having their edges spaced slightly so as to permit movement of one of the plates independently of the plate next thereto. The plates 18 in each set coact with the plates 18 in the opposed set of each pair of sets, as clearly shown in Fig. 3 of the drawings, for pulling weeds, and the facing sides of the blades or plates in each set are provided at their outer ends with roughened portions 19 which are provided for securely gripping weeds and pulling them during the operation of the weed puller.

Each of the plates 18 is provided with an opening 20 and a second opening 21 which latter opening is formed inwardly toward the shaft 6, from the outer opening 20 and these openings 20 and 21 provide guides through which rods 22 and 23 extend respectively. The rods 22 and 23 have their ends seated in grooves 24 formed in the inner sides of the cam rollers 10 and 11 which grooves are provided with depressed or deep portions 25, as indicated in the diagrammatic Fig. 6. The grooves 24 and 24' formed in the faces of the cams 10 and 11 have inclined portions 26 which lead to the depressions or deep portions 25, and lead away from the deep portions as clearly shown in Fig. 6 of the drawings, so as to provide proper longitudinal movement to the rods 22 and 23, for operating the weed pulling plates 18. The rods 22 and 23 have pins 28 and 29 extending therethrough, between which pins are coil springs 30. The springs 30 are provided for engaging the outer sides of the plates 18 of each pair of sets for yieldably moving the plates inwardly toward each other and into weed gripping positions, as shown in the lower position of Fig. 3 of the drawings upon the movement of the rods 22 and 23 by the engagement of the ends of the rods with the various portions of the grooves 24 and 24' in the cam members 10 and 11, so that the plates will be moved into a weed gripping position and yieldably held therein by the springs, so as to allow a firm grip upon either large or small weeds when the plates are in a weed receiving position during their rotary movement with the plates or rollers 12 and 13. The rods 22 and 23 extend through the rollers 12 and 13 for rotating the sets of plates 18 by the rotation of the axle 6. The grooves 24 and 24' are arranged so that when the plates move in rotary movement above a weed pulling position, the plates will be forced apart by longitudinal movement of the rods 22 and 23 through the medium of collars or washers 31 which are carried by the rods and engage the inner facing surfaces of the plates so as to move them apart as indicated in the upper portion of Fig. 3 of the drawings to allow the weeds to be removed therefrom by the scraper blades 34 and deposited upon a platform or apron 35, from which they may fall into a suitable receptacle, if it be desired to attach such a receptacle to the weed puller.

The scraper 34 is carried by a suitable supporting structure 36 and it is positioned directly above the apron 35.

The frame 5 is pivotally mounted upon the axle 1 and it has a frame 37 connected thereto which frame has an adjusting screw 38 carried by its upper end. The adjusting screw 38 extends through the handle 3 and has a wing nut 39 mounted upon its upper end which engages the upper surface of a collar 40 which is carried by the handle 3, so that the adjustment of the wing nut 39 on the screw 38 will adjust the height of the shaft 6 for regulating the height of the weed pulling members 18 so as to pull weeds from a bed of vegetables without injuring the vegetables in any way. A suitable bracing rod 41 is attached to the rear end of the frame 5 and extends upwardly through the handle 3.

In the operation of the improved weed puller; the weed puller is pushed over a bed and this pushing movement will rotate the wheels 2 and the axle 1 upon which these wheels are mounted, which rotation will be imparted to the shaft 6 through the medium of the sprockets 7 and 9 and the sprocket chain 8. The rotation of the shaft 6 will rotate the rollers 12 and 13 which being connected to the plates 18 by the rods 22 and 23 will rotate the plates while the cams 10 and 11 will remain stationary, owing to the fact that they are loosely mounted upon the shaft 6. The rotation of the plates 18 will move them into a weed pulling position, prior to which the blades are held in spaced relation by the position of the ends of the rods 22 and 23 in the grooves 24 and 24' of the cams 10 and 11 so that they will when moved toward each other by the action of the ends of the rods 22 and 23 in the grooves 24 and 24', engage weeds and firmly grip them whereby further rotation thereof will pull the weeds out of the ground and when the blades or plates are again opened by the action of the rods 22 and 23, the weeds will be delivered or released from the plates and deposited upon the apron 35. A brush structure 44 is carried by the frame 37 directly above the axle 6 and it engages the edges of the plates for brushing dirt off of the roots of the weeds.

From the foregoing description taken in connection with the accompanying drawings the advantages of construction and of the method of operation of the improved weed puller will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a weed puller, the combination of a shaft, a plurality of collars mounted upon said shaft, a plurality of weed pulling plates connected to said collars, cam members loosely mounted upon said shaft, a plurality of rods extending through said plates and engaging said cam members, whereby said plates will be moved into and out of weed gripping position during the movement of said rods about the cam surfaces of said cam members.

2. In a weed puller, the combination of a shaft, a plurality of collars mounted upon said shaft, a plurality of weed pulling plates connected to said collars, cam members loosely mounted upon said shaft, a plurality of rods extending through said plates and engaging said cam members, whereby said plates will be moved into and out of weed gripping position during the movement of said rods about the cam surfaces of said cam members, means for yieldably holding said plates in weed gripping positions, and means for rotating said plates about said shaft for removing the weeds from a pulling position into a weed delivering position.

3. In a weed puller, a shaft, a plurality of weed pulling plates pivotally carried by said shaft and arranged in opposed coacting pairs, said plates mounted for movement about said shaft, a pair of rollers carried by said shaft for rotation therewith, rods extending through said rollers for rotating said plates with the rollers, channeled cams mounted upon said shaft, the ends of said rods traveling in the channels of said cams, and means carried by said rods for moving said plates into weed gripping position and weed releasing position upon movement of said rods by engagement with said cams.

4. In a weed puller, a shaft, a plurality of weed pulling plates pivotally carried by said shaft and arranged in opposed coacting pairs, said plates mounted for movement about said shafts, a pair of rollers carried by said shaft for rotating therewith, rods extending through said rollers for rotating said plates with the rollers, channeled cams mounted upon said shaft, the ends of said rods traveling in the channels of said cams, means carried by said rods for moving said plates into weed gripping position and weed releasing position upon movement of said rods by engagement with said cams, and means carried by said rods for yieldably holding said plates in weed gripping position.

5. In a weed puller, the combination of a shaft, a plurality of weed pulling plates pivotally carried by said shaft for movement about the shaft, said plates arranged in opposed coacting pairs, rods extending through said plates, means engaging said rods for rotating said plates with the rotation of said shaft, channeled cams, the ends of said rods rotating in the channels of said cams, yieldable means carried by said rods for moving plates into weed gripping position during certain periods of rotation of the plates.

6. In a weed puller, the combination of a shaft, a plurality of weed pulling plates pivotally carried by said shaft for movement about the shaft, said plates arranged in opposed coacting pairs, rods extending through said plates, means engaging said rods for rotating said plates with the rotation of said shaft, channeled cams, the ends of said rods riding in the channels of said cams, yieldable means carried by said rods for moving said plates into weed gripping position during certain periods of the rotation of the plates, and means carried by said rods for moving said plates into weed releasing position against the action of said yieldable means during certain other periods of the rotation of the plates.

7. In a weed puller, a shaft, a plurality of weed pulling plates carried by said shaft for movement about the shaft, said plates arranged in opposed coacting pairs, said pairs of plates arranged in groups extending radially from said shaft, a pair of rods extending through each group of plates, yieldable means carried by one of each of said pair of rods for moving certain of said plates inwardly toward the transverse center of the shaft upon longitudinal movement of the rods in one direction, yieldable means carried by the second rods of each pair for moving the remaining plates of each group toward the first moved plates upon longitudinal movement of the second rods, for moving all of said plates into weed gripping position, and means for moving said rods longitudinally.

8. In a weed puller, a shaft, a plurality of weed pulling plates carried by said shaft for movement about the shaft, said plates arranged in opposed coacting pairs, said pairs of plates arranged in groups extending radially from said shaft, a pair of rods extending through each group of plates, yieldable means carried by one of each of said pair of rods for moving certain of said plates inwardly toward the transverse center of the shaft upon longitudinal movement of the rods in one direction, yieldable means carried by the second rods of each pair for moving the remaining plates of each group toward the first moved plates upon longitudinal movement of the second rods, for moving all of said plates into weed gripping position, and means for moving said rods longitudinally, means for moving said rods in a reverse direction, and means carried by said rods for moving said plates away from each other upon reversed movement of the rods.

9. In a weed puller, a shaft, a plurality of weed pulling plates pivotally carried by said shaft for movement about the shaft, said plates arranged in opposed coacting pairs, said pairs of plates arranged in groups extending radially from said shaft, a pair of rods extending through each group of plates, yieldable means carried by one of each of said pair of rods for moving certain of said plates inwardly toward the transverse center of the shaft upon longitudinal movement of the rod in one direction, yieldable means carried by the second rod of each pair for moving the remaining plates of each group toward the first moved plate upon longitudinal movement of the second rods for moving said plates into weed gripping position, means for moving said rods longitudinally, means moving said rods in a reversed direction, means carried by said rods for moving said plates away from each other upon reversed movement of said rods, means engaging said rods for rotating the plates with the rotation of said cams, said rod moving means arranged to move the plates toward each other at certain periods of the rotation of the plates and away from each other at certain other periods.

10. In a weed puller, a shaft, a plurality of weed pulling plates pivotally carried by said shaft, said plates arranged in opposed coacting pairs, said pairs of plates arranged in groups extending radially from said shafts, a pair of rods extending through each group of plates, yieldable means carried by one of each of said pair of rods for moving certain of said plates inwardly toward the transverse center of the shaft upon longitudinal movement of the rods in one direction, yieldable means carried by the second rods of each pair for moving the remaining plates in each group toward the first named plates upon longitudinal movement of the second rods for moving said plates into weed gripping position, means for moving said rods longitudinally, means for moving said rods in a reversed direction, means carried by said rods for moving said plates away from each other upon reversed movement of the rods, and a pair of rollers carried by said shaft, said rods extending through said rollers for rotating said plates with the rotation of said shaft.

11. In a weed puller, a shaft, a plurality of weed pulling plates pivotally carried by said shaft and arranged in opposed coacting pairs, said pairs of plates arranged in groups extending radially from said shaft, a pair of rods extending through each group of plates, yieldable means carried by one of each of said pair of rods for moving certain of said plates inwardly toward the transverse center of the shaft upon longitudinal movement of the rods in one direction, yieldable means carried by the second rods of each pair for moving the remaining plates of each group toward the first moved plates upon longitudinal movement of the second rods, for moving said plates into weed gripping position, a pair of channeled cams, the ends of said rods riding in said channels, said channels being provided with raised and depressed portions for moving said rods longitudinally, and means carried by said rods for moving said plates away from each other when the rods are moved by said channels in a reversed direction to the movement for moving said plates into weed gripping position, and means engaging said rods for rotating the plates with the rotation of said shaft.

In testimony whereof I affix my signature in presence of two witnesses.

ALFREDO L. ROMERO.

Witnesses:
D. C. RUSSELL,
Mrs. D. C. RUSSELL.

Copies of this patent may be obtained for five cents each, by addressing the "Commissioner of Patents, Washington, D. C."